United States Patent [19]

Burgers

[11] 4,001,825
[45] Jan. 4, 1977

[54] PULSE RADAR APPARATUS
[75] Inventor: Bernhardus Walter Antonius Burgers, Haaksbergen, Netherlands
[73] Assignee: U.S. Philips Corporation, New York, N.Y.
[22] Filed: June 14, 1974
[21] Appl. No.: 479,469
[30] Foreign Application Priority Data
   July 5, 1973  Netherlands .................. 7309382
[52] U.S. Cl. ............................... 343/7.5; 325/17; 343/5 AF
[51] Int. Cl.[2] ........................................ G01S 9/02
[58] Field of Search .......... 343/5 AF, 7.5; 325/184, 325/17

[56] References Cited
UNITED STATES PATENTS

| | | | |
|---|---|---|---|
| 2,550,519 | 4/1951 | Bataille | 325/184 X |
| 2,568,412 | 9/1951 | Robinson | 325/184 X |
| 2,677,058 | 4/1954 | Kirkman | 325/184 X |
| 2,746,031 | 5/1956 | Zaffarano | 325/184 X |
| 2,806,137 | 9/1957 | Myers | 325/184 X |
| 2,933,598 | 4/1960 | Heller et al. | 325/17 X |
| 3,146,398 | 8/1964 | Schnadelbach | 325/184 X |
| 3,320,611 | 5/1967 | Sekimoto et al. | 343/7.5 |
| 3,374,480 | 3/1968 | Russell et al. | 343/5 AF |
| 3,487,407 | 12/1969 | Lennon, Jr. et al. | 343/7.5 |

*Primary Examiner*—Malcolm F. Hubler
*Attorney, Agent, or Firm*—Frank R. Trifari; George B. Berka

[57] ABSTRACT

Pulse radar apparatus provided with a control circuit comprising at least an error voltage generator, a dither-tuned magnetron and a servo unit driving this magnetron, and also with a conditional circuit and an angular position indicator connected to the servo motor shaft for tuning the magnetron frequency $f_z$ to a frequency $f_{zo}$, showing a fixed difference $f_o$ with the local frequency $f_{lo}$, where $f_o = f_{zo} - f_{lo}$. When, by means of the indicator, the conditional circuit determines that the magnetron is being tuned in a defined frequency range comprising the frequency $f_{zo}$, the auxiliary voltage ($V_1$), used to coarse tune to frequency $f_{zo}$ is replaced by a fine tuning error voltage proportional to $|f_z - f_{lo}| - |f_o|$. This error voltage is delivered by the generator supplied with the local oscillator signal and a sample of the magnetron pulse.

17 Claims, 5 Drawing Figures

PULSE RADAR APPARATUS

The invention relates to a pulse radar apparatus provided with a control circuit to fine tune the momentary transmitter frequency $f_z$ to a frequency $f_{zo}$, which shows a difference $f_o$, fixed in sign and magnitude, with the local oscillator frequency $f_{lo}$ of the pulse radar apparatus, where $f_o = f_{zo} - f_{lo}$. The control circuit comprises at least a tunable transmitting device and a servo unit driving this device.

Such a pulse radar apparatus is known from "The frequency agile magnetron story", a publication of E.M.I.-Varian, U.S.A. In this publication the application of a dither-tuned magnetron of the coaxial type, called an "accu tune" magnetron, is recommended as a tunable transmitting device in a pulse radar apparatus of the type set forth. In such a magnetron, one shaft revolution of a servo motor in the servo unit corresponds with one up and down harmonic motion of a plunger in the resonator cavity of the magnetron.

Furthermore, this publication recommends a system arrangement for a pulse radar apparatus with the above-mentioned magnetron, where the pulse radar apparatus is also provided with a voltage generator, a resolver coupled to the shaft of the servo motor, a phase-sensitive detector connected to the resolver and a difference detector. The voltage generator supplies a reference voltage of which the amplitude is directly related to the sum frequency $(f_{lo} + f_o)$ of the local oscillator frequency $f_{lo}$ and the desired frequency difference $f_o$. The phase-sensitive detector supplies a voltage, of which the amplitude is directly related to the angular position of the motor shaft and thus to the momentary transmitter frequency $f_z$ of the magnetron. The application of the generator output voltage and the output voltage of the phase-sensitive detector to the difference detector yields a difference voltage, from which a control voltage is obtained with the aid of the servo unit. The servo motor is supplied with this control voltage, thus realising the magnetron tuning. The rotation sense of the motor shaft depends on the polarity of the difference voltage and thus on the magnitude of the transmitter frequency $f_z$ in comparison with the sum frequency $(f_{lo} + f_o)$. Since frequency difference $f_o$ is fixed accurately for the intermediate frequency part of the radar receiver, it is imperative that the voltage corresponding with the sum frequency $(f_{lo} + f_o)$ be produced with great accuracy by the voltage generator. Temperature deviations, aging of the generator elements and derangement of the adjusting elements in this generator due to mechanical vibrations do not give ground for any great expectations in respect of the set accuracy, and must be regarded as a disadvantage of this system arrangement.

It is therefore an object of the present invention to provide a system design for a pulse radar apparatus of the type set forth in the opening paragraph, which system design is based on a fine tuning of the momentary transmitter frequency $f_z$ to the desired transmitter frequency $f_{zo}$, thus eliminating the above-mentioned disadvantage.

According to the invention, two measures are taken with respect to the pulse radar apparatus. In keeping with the first measure, the control circuit is also provided with an error voltage generator and a (first) switch connected thereto. Through the application of a conventional method, this generator derives an error voltage from the signals supplied by the transmitting device and the local oscillator. The error voltage is proportional to the frequency difference $|\Delta f| - |f_o|$, where $\Delta f = f_z - f_{lo}$ being the difference between the momentary transmitter frequency $f_z$ and the local oscillator frequency $f_{lo}$. This error voltage is used for the fine tuning of the transmitter frequency $f_z$ to the desired frequency $f_{zo}$.

However, by tuning the transmitting device to the desired frequency $f_{zo}$ in accordance with the above method, the problem arises that there are in general two frequency values $f_{zo}$, viz. $f_{lo} + f_o$ and $f_{lo} - f_o$, showing the required difference $f_o$ with the local oscillator frequency $f_{lo}$, and, hence, also two values $f_z$ of the transmitter frequency $f_{lo} + \Delta f$ and $f_{lo} - \Delta F$, showing the difference $\Delta f$ with the frequency of the local oscillator $f_{lo}$. The first measure applies to both the frequencies $f_{zo} = f_{lo} + f_o$ and $f_z = f_{lo} + \Delta f$ and the frequencies $f_{zo} = f_{lo} - f_o$ and $f_z = f_{lo} - \Delta f$. Therefore, prior to the fine tuning of the transmitter frequency $f_z$ to the desired frequency $f_{zo}$ in conformity with the first measure, it is necessary to take a second measure, which comprises a coarse tuning to a frequency range containing the desired frequency value $f_{zo}$ ($f_{lo} + f_o$ or $f_{lo} - f_o$). such a frequency range should preferably comprise only those frequencies which, depending on the desired frequency value ($f_{lo} + f_o$ or $f_{lo} - f_o$), are respectively greater or smaller than the local oscillator frequency $f_{lo}$.

According to the second measure, the pulse radar apparatus is also provided with an angular position indicator, coupled to the shaft of the servo motor, and with a conditional circuit. With the aid of this indicator the conditional circuit delivers a (first) control signal during the period the transmitting device is active in a defined frequency range comprising the desired frequency $f_{zo}$. In the presence of this control signal the above-mentioned switch can be set from its (first) position, in which the transmitter frequency $f_z$ is controlled through an auxiliary voltage, to its second position. In the latter switch position the transmitting device is tuned to the desired frequenzy $f_{zo}$ by means of the error voltage. This thus clearly defines the transmitter frequency $f_{zo}$, to which the momentary transmitter frequency $f_z$ will be tuned. The diagram description hereinafter concerns an embodiment, in which the chosen frequency $f_{zo}$ is greater than the local oscillator frequency $f_{lo}$. However, a suitable radar apparatus would be obtained if $f_{zo}$ were smaller than $f_{lo}$.

With the application of the two measures in a pulse radar apparatus of the type set forth, it is still unclear which of the motor shaft positions corresponds to the plunger position at which the desired transmitter frequency $f_{zo}$ is generated. For during one revolution of the motor shaft and therefore during one complete up and down motion of the plunger, there are two plunger positions rendering the same frequency $f_{zo}$. One position is reached in that part of a complete rotation cycle of the motor shaft, in which the transmitter frequency $f_z$ is increasing, while the other position — with the same rotation sense of the motor shaft — is reached in that part of the rotation cycle, in which the transmitter frequency $f_z$ is decreasing.

On considering two initial positions of the motor shaft, yielding the same momentary transmitter frequency $f_z$, and thus producing identical error voltages, the motor shaft can be rotated only from one of the two initial positions to a position at which the desired transmitter frequency $f_{20}$ is generated, as the polarity of the error voltage is determinant for the rotation sense of the motor shaft. On the other hand, rotation of the servo motor shaft from the other initial position will cause the momentary transmitter frequency $f_z$ to displace from the desired transmitter frequency $f_{zo}$. Hence, one of the desired transmitter frequencies $f_{zo}$ corresponds to a stable operating point and the other to an unstable operating point. In order to tune the transmitting device to the desired frequency $f_{zo}$ with a stable operating point, a choice can be made from two embodiments of a pulse radar apparatus according to the invention. In a first embodiment the pulse radar apparatus is provided with a (second) voltage generator, of which the amplitude of the output voltage is directly related to the desired transmitter frequency $f_{zo}$, and also with a difference detector which derives a difference voltage, used as the auxiliary voltage mentioned above, from the output voltage of the second voltage generator and that of the angular position indicator, the latter output voltage being in sinusoidal relationship with the rotation angle of the motor shaft. According to the invention, the conditional circuit consists of a comparator which is supplied with both the output voltage of the angular position indicator and that of the second voltage generator. When the supplied output voltages show a difference which is smaller than a fixed threshold, so that the transmitting device is operating in a frequency range comprising the desired frequency $f_{zo}$, the comparator delivers the first control signal. For a fixed difference between a given value of the momentary transmitter frequency $f_z$ and the desired transmitter frequency $f_{zo}$ corresponds with the above threshold value.

The angular position indicator preferably comprises a resolver coupled with the motor shaft and a phase-sensitive detector connected to the resolver. The phase-sensitive detector delivers a voltage of which the amplitude is in sinusoidal relationship with the angular position of the motor shaft and therefore with the momentary frequency of the magnetron. With the aid of the difference detector a difference voltage is derived from the output voltage of the second voltage generator and that of the phase sensitive detector. The difference voltage is spplied to both the switch and an amplitude detector. So long as the amplitude detector is receiving a difference voltage that exceeds a fixed threshold, so that the momentary transmitter frequency $f_z$ and the above-mentioned sum frequency $(f_{lo} + f_o)$ show a significant difference with each other, the servo unit is spplied with a control voltage derived from the difference voltage via the switch. The motor shaft is rotated with the aid of this control voltage, where the rotation sense of the shaft depends on the polarity of the difference voltage and therefore on the magnitude of the momentary transmitter frequency $f_z$ in comparison with the sum value $(f_{lo} + f_o)$. However, as soon as the amplitude of this difference voltage is below the above-mentioned threshold, so that the difference between the momentary transmitter frequency $f_z$ and the sum frequency $(f_{lo} + f_o)$ is below a value corresponding with the threshold, the amplitude detector breaks the connection between the difference detector and the servo stage by means of the first switch, whereas a connection is established between the error voltage generator and the servo unit. In a second embodiment of a pulse radar apparatus according to the invention the auxiliary voltage required for the control of the transmitter frequency is derived from a constant voltage source, while with the aid of the angular positon indicator the condition circuit is delivering the first control signal from the moment the motor shaft reaches the position at which the transmitter frequency assumes the extreme value $f_{ze}$ (where $|f_{ze} - f_{zo}| < |f_{ze} - f_{lo}|$), until, maximally, the moment the shaft position corresponds with the other extreme transmitter frequency.

In this way it is achieved that the transmitter is tuned to the first suitable frequency $f_{zo}$, which occurs after passing an extreme value in the frequency range of the transmitting device. In the diagram description of the second embodiment hereinafter this implies that the transmitter is tuned to the frequency $f_{lo} + f_o$, which is attained after passing the maximum frequency.

In such a pulse radar apparatus, mechanical friction and striction of the servo mechanism is often encountered. This porblem may be obviated for example by inserting a first order control of the servo motor with a large loop gain in the control circuit. However, a large loop gain increases the chance of oscillation phenomena in the control circuit considerably; this is to be regarded as a disadvantage of such a pulse radar apparatus.

A suitable embodiment of a pulse radar apparatus according to the invention is obtained if, instead of a first order control, a second order control of the servo motor is applied. An integrating circuit is thereto inserted in the control circuit of this pulse radar apparatus between the first switch and the servo unit. The integrating circuit is preferably provided with means for a single-sided limitation of the output voltage to be supplied by the integrator.

To timely stop the mechanism, only a small rotation speed is permitted. However, in order to obtain a speedy completion of the tuning procedure, the servo motor is driven with a small tacho negative feedback during a part of the tuning procedure; only when the motor shaft approaches the position at which the desired tuning frequency is obtained the shaft is strongly braked.

A most suitable embodiment of a pulse radar apparatus according to the invention is obtained if the servo motor is braked within a period in which the difference value $\Delta f$ is in a defined frequency range extending on both sides of the fixed value $f_o$. In such a case, the moment at which the first switch is changed from the second to the first position can be delayed to the moment at which the braking of the servo motor is initiated.

The invention and its advantages wll now be described with reference to the accompanying drawings, of which:

Figure 1:
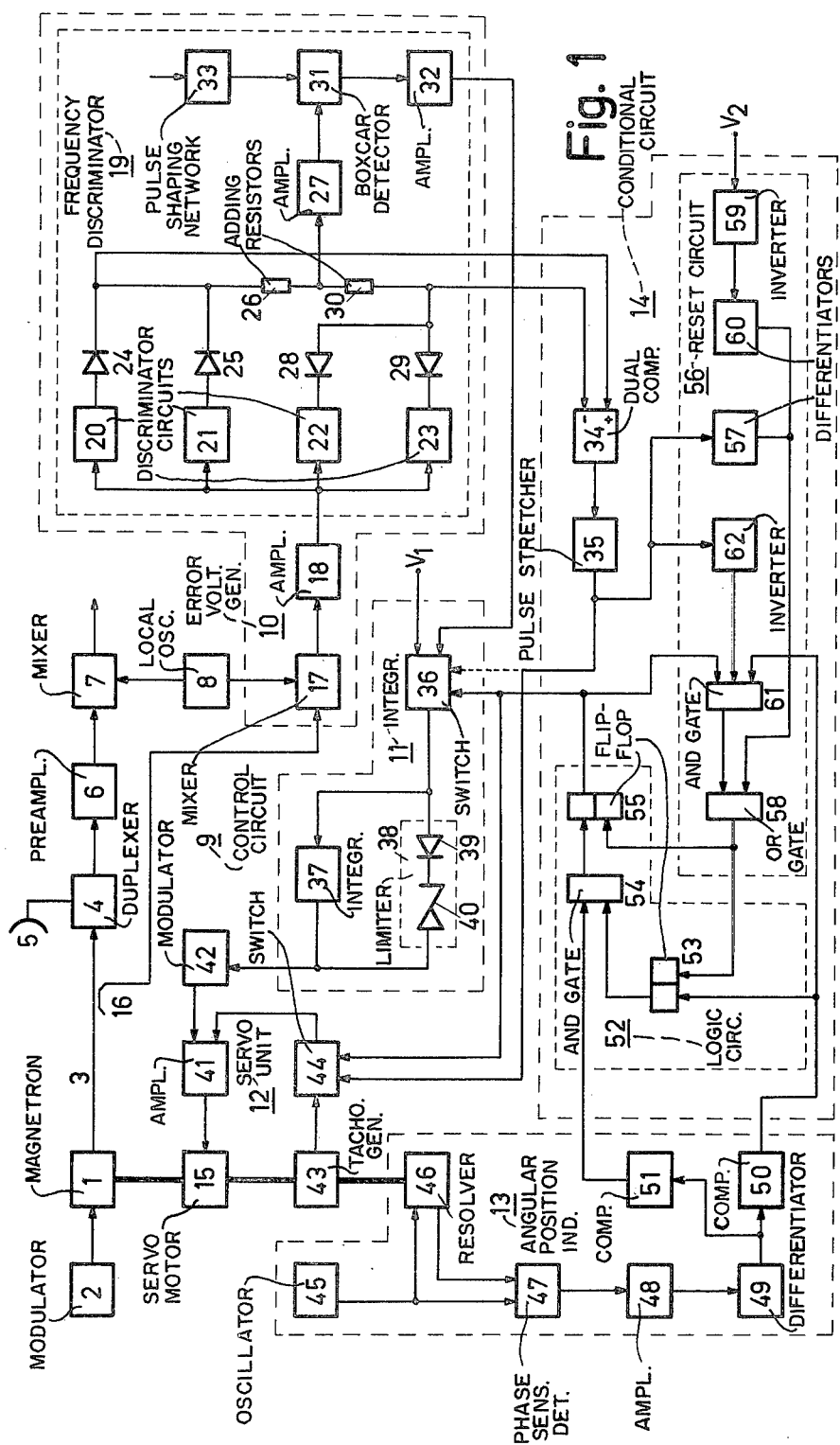
FIG. 1 illustrates an embodiment of a control system for a pulse radar apparatus according to the invention.

FIG. 1 shows a control system for the tuning of the momentary transmitter frequency $f_z$ to a desired transmitter frequency $f_{zo}$ in a pulse radar apparatus, containing a tunable magnetron 1 of a special type, known as a "dither-tuned magnetron" in radar techniques. With the aid of a high-voltage modulator 2, magnetron 1 is periodically connected to a high-voltage source for a very brief period of time, each time generating an RF pulse. The RF pulse is transmitter via a waveguide 3, a duplexer 4 and an antenna 5. The return is applied to a mixer 7 via duplexer 4 and an RF preamplifier 6. In the mixer the RF return is converted to an intermediate frequency signal. Mixer 7 is hereto supplied with the output signal of a local oscillator 8, of which the frequency, at least in the embodiment in question, is lower than the frequency of the RF pulse; besides, the local oscillator frequency should deviate from the RF pulse frequency to such an extent that a difference frequency in the intermediate frequency range is obtained from the IF signal produced in mixer 7. Since it is desired that, after switching on the pulse radar apparatus, the momentary difference frequency $\Delta f = f_z - f_{lo}$ between the frequency of the local oscillator ($f_{lo}$) and the momentary magnetron frequency ($f_z$) assumes a fixed value $f_o$ as soon as possible, and that this value is retained during the operating period of the radar apparatus, the tunable magnetron 1 according to the invention is tuned and kept tuned to the desired frequency ($f_{lo} + f_o$) with the aid of a control circuit 9. Control circuit 9 hereto contains, in addition to magnetron 1, an error voltage generator 10, an integrator 11 and a servo unit 12, while the pulse radar apparatus comprises an angular position indicator 13 and a conditional circuit 14. The function and interrelation of these subcircuits are described hereinafter. A servo motor 15 of servo unit 12, of which motor the shaft rotation sense depends on the phase of the applied control voltage, is used to drive a plunger in the cavity of the magnetron 1, the rotational motion of servo motor 15 being converted into a translational motion to move the plunger.

Figure 4:
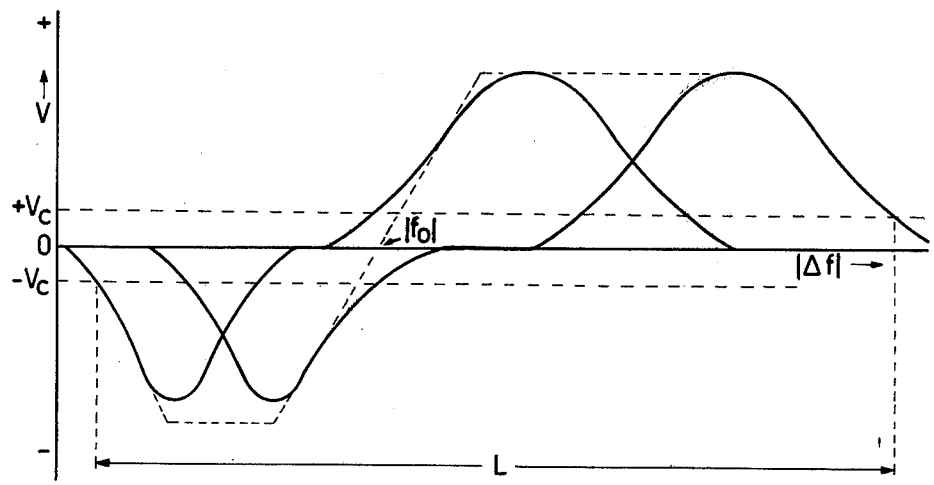
FIG. 4 represents the response characteristic of a frequency discriminator of an error voltage generator in the pulse radar apparatus.

Through a directional coupling 16 in waveguide 3, a part of the energy generated in magnetron 1 is fed to a second mixer 17 in error voltage generator 10. This mixer also receives the output signal of local oscillator 8. The mixer-generated signal, from which a signal with the momentary difference frequency $\Delta f$ can be derived, is applied through an amplifier 18 to a frequency discriminator 19 consisting of four parallel-connected circuits 20–23. FIG. 4 shows the separate response characteristics of discriminator circuits 20–23, as well as the composite characteristic of these circuits. Discriminator circuits 20–23 are tuned to different frequencies. The resonance frequencies of discriminator circuits 20 and 21 tuned to the highest frequencies are higher than the desired difference value $|f_o|$ between frequency $f_{zo}$ of tuned magnetron 1 and frequency $f_{lo}$ of local oscillator 8, while the resonance frequencies of discriminator circuits 22 and 23 are lower than difference value $|f_o|$. The resulting response characteristic of discriminator circuits 20 and 21 is to represent a practically constant output voltage of the same polarity within a wide range, while this should also be so for the resulting response characteristic of discriminator circuits 22 and 23. The filtered signals of discriminator circuits 20 and 21 are positively detected through diodes 24 and 25 respectively and applied to an amplifier 27 through a first adding resistor 26. On the other hand, the filtered signals of discriminator circuits 22 and 23 are negatively detected through diodes 28 and 29 respectively, and also fed to amplifier 27 through a second adding resistor 30. In addition, to four discriminator circuits 20–23 should be so tuned with respect to each other that the output voltage of amplifier 27 changes its polarity just at the frequency $f_o$, as shown in the characteristic of FIG. 4. With the aid of such a voltage characteristic, a tuning voltage can be determined for servo unit 12 to fine tune magnetron 1 to a frequency $f_{zo}$.

Integrator 11 connected to error voltage generator 10 is supplied with a continuous input signal, so that the pulsed output signal of amplifier 27 must be applied to a boxcar detector 31 which stretches the incoming signal for a continual amplification of this signal in a following (second) amplifier 32. Thereto the access to boxcar detector 31 is opened only during the period when an output signal is obtained from amplifier 27 or during a part of this period; this occurs through a pulse shaping network 33 controlled either by a transmitter synchronisation pulse or a sample of an RF pulse.

In addition to the output signal of amplifier 32 applied as error voltage signal of generator 10 to integrator 11, generator 10 produces another two output signals which are delivered to condition circuit 14 in the last tuning stage of magnetron 1. To this effect the signals obtained through diodes 24–25, 28–29 are fed separately to a dual comparator 34 in condition circuit 14. In this comparator the positively detected signal voltages are compared with a positive reference voltage $+V_c$ and the negatively detected signal voltages with a negative reference voltage $-V_c$. When one of the signals exceeds the respective reference voltage (this can only occur within the frequency range indicated by L in the characteristic of FIG. 4), comparator 34 delivers a standard pulse. To obtain the afore-mentioned continuous output signal, each standard pulse is fed to a pulse stretcher 35. On each applicaton of a standard pulse, the pulse stretcher 35 is capable to supply an output signal of a corresponding magnitude, continuously available for several pulse repetition times. Thus the output signal is stretched in the absence of consecutive RF pulses. In this way it is achieved that, as soon as the difference frequency $\Delta f$ is within frequency range L (see FIG. 4), conditional circuit 14 delivers a continuous output signal, hereinafter designated as second control signal.

Figure 5:
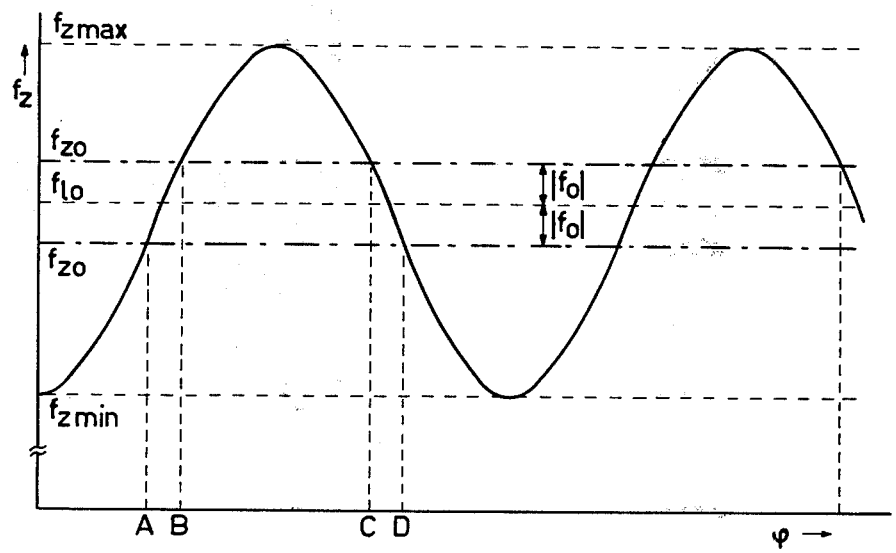
FIG. 5 illustrates the relation between the magnetron frequency $f_z$ and the angular position $\phi$ of the motor shaft at a constant control voltage for the servo motor.

So long as magnetron 1 is not tuned to the correct frequency, servo unit 12 is to be supplied with a control voltage, so that the plunger in magnetron 1 can be moved; this movement of the plunger will tune magnetron 1 in accordance with the characteristic of FIG. 5. This characteristic illustrates the relationship between the momentary transmitter frequency $f_z$ and the angular position $\phi$ of the motor shaft rotating, for example, in positive sense, in which case integrator 11 must be supplied with a positive voltage. Therefore, the characteristic of FIG. 5 also shows the relationship between the momentary transmitter frequency $f_z$ and the time $t$ at a constant control voltage for servo unit 12 and hence at a constant speed of the motor shaft. The frequency characteristic of FIG. 5 shows that in one rotation cycle of the motor shaft there are four shaft positions A, B, C and D, at which the momentary transmitter frequency $f_z$ shows the desired deviation $f_o$ with respect to frequency $f_{lo}$ of the local oscillator 8. However, since in the embodiment in question magnetron 1 should have a higher frequency than local oscillator 8, the choice of obtaining the desired magnetron frequency should be limited to positions B and C (see FIG. 5). Therefore, the characteristic of FIG. 4 for the fine tuning of magnetron 1 to the desired tuning frequency $f_{zo}$ should not be applicable to the momentary transmitter frequencies $f_z$ with values smaller than the local oscillator frequency $f_{lo}$. The steps thereto taken will be described later.

It will now be considered what the effect will be if magnetron 1 is tuned with the motor shaft rotating in a positive sense, i.e. with the supply of a positive voltage to integrator circuit 11, whereby the transmitter frequency $f_z$ increases, through frequency value $f_{lo}$, to the desired value $f_{zo}$ corresponding with position B of the motor shaft. During such a frequency change, the coarse tuning of magnetron 1 through the latter positive voltage is to be changed to fine tuning by means of an error voltage as indicated by the voltage characteristic of FIG. 4. This error voltage is negative when $\Delta f$ is less than $f_o$, thus when momentary transmitter frequency $f_z$ is greater than frequency $f_{lo}$, but smaller than $f_{lo} + f_o$, so that the motor shaft is forced to rotate in the opposite direction, thus in the negative sense. Consequently, magnetron 1 is not tuned to the frequency corresponding to position B, but away from it. However, if the motor shaft, rotating in positive sense, possesses a large amount of rotational energy when position B is approached and this shaft cannot be braked in time, magnetron 1 will overshoot the respective set value. In this case $\Delta f$ becomes greater than $f_o$, so that the tuning voltage turns positive and the rotation sense assumed by the motor shaft is retained; magnetron 1 will then be tuned to higher frequency values. The above thus shows that magnetron 1 cannot be set to a frequency corresponding to position B. Hence, the fine tuning through the error voltage, as shown in FIG. 4, is applicable only for a frequency tuning corresponding to position C. Subsequently, what will be the effect when magnetron 1 is tuned with the motor shaft rotating in positive sense, whereby the transmitter frequency $f_z$ is tuned, through the extreme value $f_{zmax}$, to the desired value $f_{zo}$ corresponding with positon C of the motor shaft. During such a tuning procedure, the coarse tuning of magnetron 1 is to be changed to fine tuning through an error voltage to be generated in accordance with the voltage characteristic of FIG. 4. Now, $\Delta f$ is greater than $f_o$, so that the error voltage generator 10 delivers a positive error voltage in accordance with the characteristic of FIG. 4. Consequently, the rotation sense already assumed by the motor shaft is retained, and magnetron 1 is kept tuned to the frequency corresponding to position C. In case the servo motor shaft is not braked in time, magnetron 1 will overshoot the point corresponding to position C, so that $\Delta f$ will become smaller than $f_o$. According to the characteristic of FIG. 4, this produces a negative error voltage, causing the motor shaft to rotate in the opposite sense, and magnetron 1 is tuned back to the frequency value corresponding to position C. Hence, it can be stated that position C renders a stable frequency of magnetron 1.

Since the tuning to frequency $f_{zo}$ corresponding to position A is not desirable, and tuning to frequency $f_z$ corresponding to positon B is not possible, servo unit 12 requires a control voltage, which is derived from a positive auxiliary voltage $V_1$, at least during the period in which magnetron 1 is tuned to the maximum frequency value $f_{zmax}$ with the motor shaft rotating in positive sense. Auxiliary voltage $V_1$ now takes the place of the control voltage derived from the error voltage and used for the fine tuning. Integrator 11 thereto comprises at least a first switch 36 and an integrator 37, while a first control signal supplied by conditional circuit 14 controls switch 36 in such a way that integrator 37 receives the required positive auxiliary voltage $V_1$ in the afore-mentioned period. The output voltage of integrator 37 then obtains a rapidly increasing negative value; however, owing to a limiter 38, comprising a diode 39 and a zener diode 40, across integrator 37, this voltage is held at a lower limit corresponding to the breakdown voltage of zener diode 40.

In case servo motor 15 is powered by a d.c. supply, the output voltage of integrator 37 is directly applied to a servo amplifier 41 in servo unit 12. If, however, servo motor 15 is driven by an a.c. voltage, the output voltage of integrator 37 is fed to a modulator 42, in which the applied voltage is modulated in amplitude and frequency and then fed to amplifier 41. Hence, during the period the constant voltage $V_1$ is applied to integrator 11, servo motor 15 receives a uniform control voltage, ensuring a constant rotational speed of servo motor 15 in a defined sense.

Servo unit 12 also comprises a tacho generator 43, of which the output voltage is fully or partly fed back to servo amplifier 41 for servo motor 15 through a second switch 44. During the period the integrator 37 is supplied with voltage $V_1$, conditional circuit 14 operates switch 44 in such a way that only a part of the voltage generated by tacho generator 43 is applied to servo amplifier 41. In this way a reasonably constant and rather high rotational speed of the servo motor 15 is ensured.

After the tuning of magnetron 1 to the maximum frequency $f_{zmax}$ with the motor shaft rotating in positive sense, the magnetron is to be tuned from $f_{zmax}$ to $f_{zo}$, which corresponds to position C.

In a first mode, the output of amplifier 32 is connected to the input of integrator 37 through switch 36. Initially, the value of the error voltage is practically equal to zero due to the large value of $\Delta f$. Therefore, the output voltage of integrator 37 remains unchanged, so that the servo motor retains practically the same speed, and magnetron 1 is tuned accordingly. Subsequently, the moment arrives when $\Delta f$ is within the response range of the characteristic (see FIG. 4), and it is urgently required that the rotational speed of servo motor 15 be reduced drastically. To this effect, switch 44 is set to the other position through the first and second control signals supplied by conditional circuit 14 so that the full tacho voltage is applied to servo amplifier 41. The result is that the control voltage of integrator 37 is overcompensated and, hence, the rotational speed of servo motor 15 is drastically reduced. Consequently, the magnetron plunger performs a damped motion, which is preferably just above the critical point, so that magnetron 1 approaches and passes the desired stable point corresponding with position C rather quickly. $\Delta f$ then becomes smaller than $f_o$, so that the polarity of the error voltage (see FIG. 4) changes. Preferably, integrator 37 is replaced by a proportional integrator, which generates a given initial negative output voltage immediately upon a polarity change. The result is that a considerable counter voltage is generated for servo motor 15, so that the magnetron is tuned quickly to and past the desired stable point. In this way magnetron 1 is fine tuned to the point corresponding to position C (see FIG. 5).

The second mode, in which magnetron 1 is coarse tuned from $f_{zmax}$ to the desired value $f_{zo}$ corresponding to position C and fine tuned to the latter frequency, differs from the first mode only in this respect that switch 36 changes its position not on reaching the maximum magnetron frequency $f_{zmax}$, i.e. not on the generation of the first control signal, but at the moment the second control signal is generated in the presence of the first control signal. This condition is easily satisfied, for example by inserting an AND gate in the system, which gate receives the first and the second control signals of the conditional circuit 14 and which operates switch 36.

To obtain the first control signal, conditional circuit 14 must be supplied with one or several signals to derive the moment of the maximum frequency $f_{zmax}$ of magnetron 1 and thus the motor shaft position corresponding with this frequency. The pulse radar apparatus is hereto provided with an angular position indicator 13 coupled to the motor shaft. The output of this indicator is connected to conditional circuit 14. Angular position indicator 13 and conditional circuit 14 matched thereto can be realized in three embodiments, of which the first will be described with reference to FIG. 1 and the two others with reference to FIGS. 2 and 3.

In the first embodiment, angular position indicator 13 comprises an oscillator 45, a resolver 46 coupled to the motor shaft, a phase-sensitive detector 47, an amplifier 48, a differentiator 49 and two comparators 50 and 51. Oscillator 45 supplies an a.c. reference voltage to the primary winding of resolver 46, inducing a voltage across the secondary winding of this resolver. The amplitude and phase of this induced voltage depends on the angular position of the rotating part of resolver 46. The induced voltage is detected in phase-sensitive detector 47 with the aid of the reference voltage of oscillator 45; this results in an output voltage which is in sinusoidal relationship with the rotation angle of resolver 46 with respect to a fixed reference position and is fed to differentiator 49 via amplifier 48. The output voltage obtained from this differentiator is applied to two comparators 50 and 51. Comparator 50 produces a positive output signal only when the output voltage of differentiator 49 exceeds a fixed positive value, indicating that magnetron 1 is tuned to a higher frequency. On the other hand, comparator 51 delivers a positive output voltage only when the output voltage of differentiator 49 is below a fixed negative value, so that magnetron 1 is tuned to a lower frequency. The signals produced by comparators 50 and 51 are supplied separately to a logic circuit 52 forming part of conditional circuit 14, and comprising successively an R-S flip-flop 53, an AND gate 54 connected to the Q-output of flip-flop 53 and a second R-S flip-flop 55, where the S-input of flip-flop 53 is connected to comparator 50, while the S-input of flip-flop 55 is connected AND gate 54. As soon as comparator 50 delivers an output voltage of logical level "1", which is for example the case when magnetron 1 is tuned to a higher frequency $f_z$ with the motor shaft rotating in positive sense, the Q-output of flip-flop 53 will also acquire such an output voltage. If now comparator 51 delivers an output voltage of logical level 1, which is attained if magnetron 1 is tuned from the maximum frequency $f_{zmax}$ to a lower frequency, AND gate 54 receives two signal voltages of logical level 1. Consequently, the Q-output of flip-flop 55 will also be logical 1, so that the first control signal is obtained.

It is however wrong to suppose that the generation of the first control signal can already take place on fulfilling only the condition that the value of the momentary transmitter frequency $f_z$ decreases with the motor shaft rotating in positive sense. If the system operates in the first mode and amplifier 32 is connected to integrator circuit 37 through switch 36, it may be that, when the pulse radar apparatus is switched on, magnetron 1 assumes an initial position, at which $\Delta f$ does not lie in the response range L of FIG. 4. The absence of the error voltage causes that magnetron 1 can hardly or cannot be tuned. If the system is to operate in the second mode, and the pulse radar apparatus is switched on, magnetron 1 could be at the frequency setting near position D (see FIG. 5), such that the momentary transmitter frequency $f_z$ lies between $f_{lo}$ and $f_{lo} - f_o$. So long as the value of the difference frequency $\Delta f$ is small, so that the second control signal is absent, servo motor 15 continues to run in positive sense with the application of the positive voltage $V_1$ for proportional integrator 37. However, as soon as the magnetron frequency attains a value, at which the second control signal is generated, the rotation sense of the motor shaft changes, causing the momentary transmitter frequency $f_z$ to increase. The result is that $\Delta f$ becomes smaller and the second control signal will rapidly disappear. In this way, magnetron 1 could be fine tuned to a certain frequency $f_x$, where $f_{lo} - f_o < f_x < f_{lo}$. The above-mentioned problems relative to the two modes can be avoided by commencing the tuning of magnetron 1 to a frequency $f_{zo}$ not until the momentary transmitter frequency $f_z$ has increased, with the motor shaft rotating in positive sense, before $f_z$ starts decreasing. Therefore, first the output level of comparator 50 should be logical 1, and then that of comparator 51. This implies that, in case the magnetron frequency corresponds with position D (see FIG. 5) upon switching on the pulse radar apparatus, the magnetron tuning should be such that first the maximum frequency $f_{zmax}$ is reached before tuning to a frequency $f_{zo}$. In this way it can be ensured that magnetron 1 is tuned to a frequency $f_{lo} + f_o$ corresponding with position C. The situations described below deserve special attention:

a. The output signal of local oscillator 7 or magnetron 1 drops, out, or the tuning frequency of local oscillator 8 changes drastically, during a period magnetron 1 is tuned to or near to the desired frequency $f_{zo}$ corresponding with position C in the presence of the second control signal.

b. During the tuning to a frequency corresponding to position C (see FIG. 4), $\Delta f$ decreases to such a small value (due to insufficient braking of servo motor 15) that the second control signal already present drops out.

c. The quality of magnetron 1 is so poor that a considerable number of missing links are produced.

d. The supply voltage of the pulse radar apparatus is switched on.

e. Local oscillator 8 is not operative until the supply voltage has been switched on for some time.

f. The local oscillator signal drops out for some time in a period when the second control signal is absent, whereas magnetron 1 is tuned to frequency $f_{zo}$ corresponding with position C.

In all of these cases it is advisable to repeat the tuning procedure of magnetron 1, irrespective of the setting frequency of magnetron 1. This implies that, with the motor shaft rotating in positive sense, frequency $f_z$ of magnetron 1 should first be increasing and then decreasing. To this effect, reset pulses must be applied to the R-input of flip-flops 53 and 55. This will change the value of the first control signal of flip-flop 55, which signal is intended for switch 36, so that positive voltage $V_1$ is again supplied to proportional integrator 37. At the same time, the second switch 44 is set to another position, reducing the tacho counter voltage to be applied to servo amplifier 41. To generate these reset pulses, conditional circuit 14 is provided with a reset circuit 56, which should be activated in each of the above-mentioned situations $a$–$f$. This will be explained in more detail.

On the presence of one of the situations $a$–$c$, the second control signal drops out immediately. The tuning process already started should then be terminated at once. Reset circuit 56 hereto contains a differentiator 57, connected to the output of pulse stretcher 35. Only if the second control signal drops out, differentiator 57 resets flip-flops 53 and 55 through an OR gate 58.

Furthermore, differentiator 57 excludes the possibility that magnetron 1 remains too long at an unstable point corresponding with position B or D; for in the vicinity of each of these positions the magnetron is tuned away from the respective frequency $f_{zo}$, so that the second control signal disappears, and differentiator 57 produces a reset pulse for flip-flops 53 and 55.

In the case of situation $d$ it may occur that magnetron 1 is set to near frequency $f_{zo}$ corresponding with position A (see FIG. 5) and that $\Delta f$ lies within the response range L (see FIG. 5). The magnetron would then be tuned to a frequency $f_{lo} - f_o$, which is unsuitable for the embodiment in question. This is to be avoided. Also in situation $d$, when the pulse radar apparatus is operating in the first mode, it may be that in the presence of the first control signal the transmitter frequency $f_z$ deviates from the local oscillator frequency $f_{lo}$ to such an extent that amplifier 32 does not deliver an error voltage. Besides, if the difference voltage across the proportional integrator 37 has already leaked away, servo motor 15 receives a small or no control voltage and magnetron 1 is left in the wrong setting. To avoid these problems, flip-flops 53 and 55 are to be reset directly. Reset circuit 56 is thereto provided with a (first) inverter 59 and a second differentiator 60, which has only a differentiating function for decreasing functions, like differentiator 57. A change in reference voltage $V_2$ derived from the supply voltage is passed to differentiator 60 through inverter 59. Differentiator 60 therefore delivers a pulse voltage only in case the supply voltage is switched on. The pulse voltage is fed as a reset pulse to flip-flops 53 and 55 through OR gate 58.

In case of situation $e$ or $f$, the momentary transmitter frequency $f_z$ may decrease after increasing, so that the Q-output of flip-flop 55 delivers the second control signal. However, in this case no local oscillator signal is available and the proportional integrator 37 cannot be supplied with an error voltage. Consequently, magnetron 1 is tuned past frequency $f_{zo}$ corresponding with position C, so that differentiator 57 does not generate a reset pulse because of the absence of the second control signal. Magnetron 1 then approaches the unstable point corresponding to position D. If at this moment the local oscillator signal appears, the rotation sense of the motor shaft will be reversed owing to the negative error voltage, so that magnetron 1 is detuned to a higher frequency. Consequently, the second control signal drops out, whereupon differentiator 57 delivers a reset pulse to flip-flops 53 and 55. If, however, the local oscillator signal is not yet available and the second control signal is thus absent, detuning of magnetron 1 is continued, and transmitter frequency $f_z$ again increases after reaching the minimum value $f_{zmin}$. The magnetron is then tuned to frequency $f_{zo}$ corresponding with position A; this should be avoided in view of the low value of frequency $f_{zo}$. Therefore, flip-flops 53 and 55 should also receive a reset pulse as soon as the momentary transmitter frequency $f_z$ again increases after it has first increased and then decreased. This condition is satisfied if the output voltage of comparator 50 and that of flip-flop 55 are logical 1 simultaneously. Reset circuit 56 is thereto provided with an AND gate 61, which is connected to the output of flip-flop 55 and that of comparator 50. The output of AND gate 61 is connected to the input of OR circuit 58.

It should however be noted that during the tuning of magnetron 1 the frequency $f_z$, after it has increased to $f_{zmax}$ and then decreased, will gain increase during the following fine-tuning process about frequency $f_{zo}$ corresponding to position C. In this case, the conditions required to obtain a reset pulse from AND gate 61 are fulfilled. This should however be avoided. The peculiar aspect of the magnetron tuning to a frequency corresponding to position C is, however, that this occurs only in the presence of the first control signal. Therefore, the delivery of the reset pulse can be avoided in this situation by passing the output information of the pulse stretcher 35 to AND gate 61 through an inverter 62.

Figure 2:
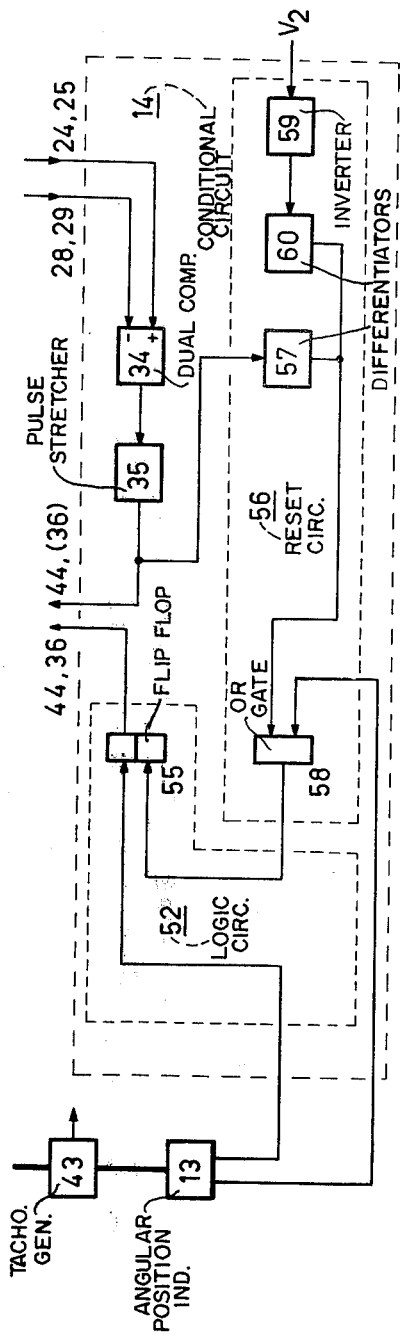
FIGS. 2 and 3 show two alternatives of a part of the aforementioned control system.
Figure 3:
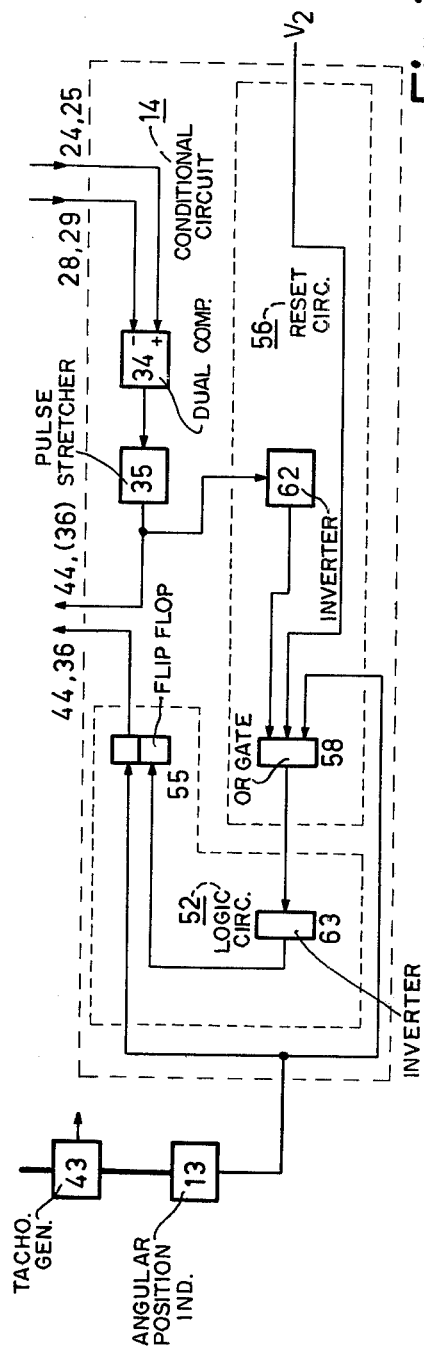

In the pulse radar apparatus in question, the combination of angular position indicator 13 and conditional circuit 14, shown in FIG. 1, may quite well be replaced by similar combinations illustrated in FIG. 2 or 3. If parts of the combination shown in FIG. 2 or 3 are not further described, the explanation given for the combination of FIG. 1 applies.

In FIG. 2 the angular position indicator 13, which is also coupled with the shaft of servo motor 15, is a maximum and minimum indicator. This indicator type supplies a signal at the time the motor shaft passes the position, at which the maximum transmitter frequency $f_{zmax}$ is reached, and also at the time the minimum transmitted frequency $f_{zmin}$ is reached. The signal generated on reaching $f_{zmax}$ is applied to the S-input of flip-flop 55 and the signal generated on attaining frequency $f_{zmin}$ is fed to the R-input of flip-flop 55 through OR gate 58. Therefore, the output signal of flip-flop 55 can be utilized as first control signal. The above-mentioned maximum and minimum indicator may be of various designs. For example, the motor shaft can be provided with a disc containing an opening, one side of the disc being provided with a light emission circuit and the other sides with a photo-receptor circuit, such that the light-emission circuit activates the photo-receptor circuit through the opening in the disc at the moment the maximum transmitter frequency $f_{zmax}$ is reached. A second combination of a light-emission circuit and a photo-receptor circuit is to be mounted analogously with respect to the disc, where the light-emission circuit activates the photo-receptor circuit through the opening in the disc at the moment the minimum transmitter frequency $f_{zmin}$ is attained.

The angular position indicator 13 in FIG. 3 is designed as a sector indicator, which delivers a signal only during the period the momentary transmitter frequency $f_z$ is decreasing. Such an indicator can be obtained for instance by mounting a disc to the motor shaft of the servo motor 15, one half of the disc being provided with a recess. Besides, a light-emission circuit is again mounted to one side of the disc and a photo-receptor circuit to the other side, where the photo-receptor circuit is activated through the light-emission circuit at the moment the transmitter frequency $f_z$ is decreasing. In the embodiment in question, the information of the angular position indicator is fed to flip-flop 55 directly, as well as through OR gate 58 and inverter 63. Flip-flop 55 in FIG. 3 responds only to falling voltage edges, unlike flip-flop 53 shown in FIGS. 1 and 2. Thus the output signal of flip-flop 55 can be used as first control circuit. Consequently, the first differentiator 57 can be replaced by an inverter 62 and the reference voltage $V_2$ of the supply voltage can be fed direct to the OR gate.

Instead of the light-emission circuit and the photo-receptor circuit cited in the description of FIGS. 2 and 3 for the angular position indicator 13, other means may be applied, such as mechanical switches, magnetic switches, electrostatic and magnetic receptors.

In view of the response characteristic (see FIG. 4), it may be noted that the response need not decrease below a certain value of $\Delta f$. In principle, it is also possible to apply a frequency discriminator 19, where the response characteristic is still constant even for higher values of $\Delta f$. It is however required to assign a minimum frequency range to that part of the response characteristic which is positive with respect to the frequency value $f_o$. Otherwise, the second control signal would be of too short a duration, so that only a short braking time would be available for the motor shaft, and the tuning to frequency $f_{zo}$ corresponding to position C would be impaired.

What we claim is:

1. Pulse radar apparatus comprising: a tunable transmitting device including movable tuning member operable for changing, within a defined frequency range, a momentary transmitter frequency $f_z$ to a desired frequency $f_{zo}$ which is tunable in two different positions of said member; a receiver device including a local oscillator operating at a frequency $f_{lo}$ differing from the frequency $f_{zo}$ about a fixed frequency $f_o$; a servo motor the shaft of which is coupled to said tuning member; an error voltage generator including a mixer supplied with $f_z$ and $f_{lo}$, respectively, to produce a signal having a frequency $\Delta f$ corresponding to the difference between $f_z$ and $f_{lo}$, and including frequency discriminating means connected to the output of said mixer for deriving from said signal $\Delta f$ both an error voltage proportional to the frequency difference between $\Delta f$ and $f_o$, and frequency discriminating signals indicating the operation of the transmitter device within said defined frequency range; a source of an auxiliary voltage for a coarse adjustment of said servo motor; first switching means connected for passing in one switching position, said auxiliary voltage, and in the other switching position, said error voltage to said servo motor; an angular position indicator operatively coupled to the shaft of said servo motor to generate a signal indicating momentary angular position of said shaft; and a conditional circuit controlled by said frequency discriminating signals from said error voltage generator and by said signal from said angular position indicator to produce a first control signal applied to said first switching means to change said one switching position to said other switching position to provide a fine adjustment of said servo motor by said error voltage.

2. Pulse radar apparatus as claimed in claim 1, wherein the angular position indicator includes a maximum indicator and a minimum indicator, to deliver a signal indicating the angular motor shaft position corresponding with the maximum and minimum transmitter frequency respectively, and wherein the conditional circuit is provided with a bistable multivibrator, which is supplied with the latter signal to generate the first control signal.

3. Pulse radar apparatus as claimed in claim 1, wherein the auxiliary voltage is derived from a constant voltage source and the conditional circuit supplies the first control signal from the moment the motor shaft reaches the position, at which the transmitting device assumes one extreme value $f_{ze}$, where $|f_{ze} - f_{zo}| < |f_{ze} - f_{lo}|$ until, the moment the motor shaft position corresponds to the other extreme transmitter frequency.

4. Pulse radar apparatus as claimed in claim 1, wherein an integrator is inserted in the control circuit between the first switching means and the servo unit.

5. Pulse radar apparatus as claimed in claim 4, wherein the integrator is a proportional integrator provided with means for single-sided limitation of its output voltage.

6. Pulse radar apparatus as claimed in claim 1, wherein said source of auxiliary voltage includes a second generator for producing a signal the amplitude of which is related to the frequency $f_{zo}$, a difference detector for producing said auxiliary voltage from the difference between said signal from the second generator and the signal from said angular position indicator, and said conditional circuit including a comparator for comparing the signals from the second voltage generator and the angular position indicator to a fixed threshold voltage, to produce the first control signal when the compared signals are below said threshold voltage.

7. Pulse radar apparatus as claimed in claim 1, wherein the conditional circuit includes means for producing a second control signal within a time period in which the signal $\Delta f$ is in the defined frequency range extending on both sides of the frequency $f_o$, and said control means includes second switching means controlled by the first and second control signals for applying a braking voltage to the servo motor.

8. Pulse radar apparatus as claimed in claim 7, wherein the frequency discriminating means of the error voltage generator contains two pairs of parallel connected discriminator circuits tuned to different frequencies, each pair being provided with means for detecting output voltages of opposite polarity, and wherein the conditional circuit comprises a dual comparator having two inputs and an output, said inputs being supplied with the frequency discriminating signals, and said output being connected to a pulse stretching circuit to produce the second control signal.

9. Pulse radar apparatus as claimed in claim 7, wherein the first switch is set from its second position to its first position only in the presence of both the first and the second control signals.

10. Pulse radar apparatus as claimed in claim 7, wherein the motor is braked with the aid of a tacho generator contained in the servo unit, whereby the tacho generator voltage is fed back to the motor through said second switch.

11. Pulse radar apparatus as claimed in claim 1, wherein the angular positon indicator contains a rise detector and a fall detector to deliver a slope-indication signal corresponding to an increasing or decreasing transmitter frequency, and wherein the conditional circuit comprises a first bistable multivibrator, a first AND gate and a second bistable multivibrator of which the first bistable multivibrator and the first AND gate are separately connected to the rise and fall detectors, and the second bistable multivibrator supplies the first control signal.

12. Pulse radar apparatus as claimed in claim 11, wherein the rise detector and the fall detector comprise a common resolver coupled to the shaft of the servo motor, a phase-sensitive detector connected to the resolver, a common (first) differentiator connected to the phase-sensitive detector, and a comparator connected to said differentiator, each of the comparators supplying one of the two slope-indication signals.

13. Pulse radar apparatus as claimed in claim 11, wherein the conditional circuit comprises a first differentiator connected to the hold circuit, of which differentiator the output signal is supplied to the reset input of each bistable multivibrator contained in the conditional circuit.

14. Pulse radar apparatus as claimed in claim 11, wherein the conditional circuit comprises a second differentiator, through which a reset signal for each of the bistable multivibrators is obtained.

15. Pulse radar apparatus as claimed in claim 11, wherein the conditional circuit contains a second AND gate connected to the rise detector, the second bistable multivibrator and, via a second inverter, to the holder circuit, the output signal of the second AND gate is supplied to the reset input of each of the two bistable multivibrators.

16. Pulse radar apparatus as claimed in claim 1, wherein the angular position indicator includes a sector detector to deliver a signal from the moment the motor shaft position corresponds to one extreme value of the transmitter frequency until the moment the motor shaft position corresponds to the other extreme frequency value, and wherein the conditional circuit comprises an inverter and a bistable multivibrator connected to said sector detector, to generate said first control signal.

17. Pulse radar apparatus as claimed in claim 16, wherein the sector detector comprises a disc mounted to the motor shaft and a sector indicator which works together with said disc through a recess extending over one half of the disc.

* * * * *

UNITED STATES PATENT AND TRADEMARK OFFICE
CERTIFICATE OF CORRECTION

PATENT NO. : 4,001,825
DATED : January 4, 1977
INVENTOR(S) : BERNHARDUS W.A. BURGERS It is certified that error appears in the above-identified patent and that said Letters Patent are hereby corrected as shown below:

In the Title Page, Section [73], "U.S. Philips Corporation"

should read --Hollandse Signaalapparaten

B.V. The Netherlands---.

Column 3, line 44, "spplied" should read --supplied--

Column 4, line 1, "positon" should read --position-- line 18, "porblem" should read --problem--

Column 12, line 11, "1" should read --"1"--

Signed and Sealed this

Sixth Day of December 1977

[SEAL]

Attest:

RUTH C. MASON
*Attesting Officer*

LUTRELLE F. PARKER
*Acting Commissioner of Patents and Trademarks*